(12) United States Patent
Miyatani

(10) Patent No.: US 9,153,030 B2
(45) Date of Patent: Oct. 6, 2015

(54) POSITION AND ORIENTATION ESTIMATION METHOD AND APPARATUS THEREFOR

(75) Inventor: Sonoko Miyatani, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 360 days.

(21) Appl. No.: 13/580,024

(22) PCT Filed: Jan. 12, 2011

(86) PCT No.: PCT/JP2011/050796
§ 371 (c)(1),
(2), (4) Date: Aug. 20, 2012

(87) PCT Pub. No.: WO2011/105134
PCT Pub. Date: Sep. 1, 2011

(65) Prior Publication Data
US 2012/0320053 A1 Dec. 20, 2012

(30) Foreign Application Priority Data
Feb. 25, 2010 (JP) .................................. 2010-040595

(51) Int. Cl.
*G06T 17/00* (2006.01)
*G06T 7/00* (2006.01)
(52) U.S. Cl.
CPC ..... *G06T 7/0046* (2013.01); *G06T 2207/10004* (2013.01); *G06T 2207/10028* (2013.01); *G06T 2207/30164* (2013.01)
(58) Field of Classification Search
None
See application file for complete search history.

(56) References Cited

U.S. PATENT DOCUMENTS

| 6,721,444 | B1* | 4/2004 | Gu et al. | 382/154 |
| 2005/0128197 | A1* | 6/2005 | Thrun et al. | 345/421 |
| 2005/0129304 | A1* | 6/2005 | Sasazawa et al. | 382/150 |

(Continued)

FOREIGN PATENT DOCUMENTS

| CN | 1293752 A | 5/2001 |
| CN | 1747816 A | 3/2006 |

(Continued)

OTHER PUBLICATIONS

Talluri et al., Mobile Robot Self-Location Using Model-Image Feature Correspondence, Feb. 1996, IEEE Transactions on Robotics and Automation, vol. 12, No. 1, pp. 63-77.*

(Continued)

*Primary Examiner* — Ulka Chauhan
*Assistant Examiner* — Anh-Tuan V Nguyen
(74) *Attorney, Agent, or Firm* — Canon USA, Inc. IP Division

(57) ABSTRACT

There is provided a method for accurately estimating a position and orientation of an object even if the object is more dispersive in shape than a three-dimensional geometric model with a standard shape. The statistic of deviation of a feature constituting a three-dimensional model representing a three-dimensional standard shape of an object is estimated to determine a reliability for each feature. The amount of deviation is calculated between the feature extracted from observation data obtained by an imaging apparatus and the feature in the three-dimensional model. The three-dimensional position and orientation of the object is estimated based on the amount of deviation and the reliability related to each feature extracted from the three-dimensional model.

14 Claims, 12 Drawing Sheets

(56) References Cited

U.S. PATENT DOCUMENTS

| | | | |
|---|---|---|---|
| 2006/0154611 A1* | 7/2006 | Newton et al. | 455/67.16 |
| 2006/0181236 A1* | 8/2006 | Brogardh | 318/568.1 |
| 2006/0221417 A1* | 10/2006 | Fujieda et al. | 358/538 |
| 2006/0250305 A1* | 11/2006 | Coluzzi et al. | 342/458 |
| 2007/0009135 A1* | 1/2007 | Ishiyama | 382/103 |
| 2007/0299559 A1* | 12/2007 | Janssen et al. | 700/259 |
| 2008/0212835 A1* | 9/2008 | Tavor | 382/103 |
| 2009/0112511 A1* | 4/2009 | Chang et al. | 702/167 |
| 2009/0153673 A1 | 6/2009 | Chu | |
| 2009/0195557 A1* | 8/2009 | Nakamura | 345/632 |

FOREIGN PATENT DOCUMENTS

| | | |
|---|---|---|
| CN | 1846232 A | 10/2006 |
| CN | 101038623 A | 9/2007 |
| CN | 101424520 A | 5/2009 |
| JP | 09-81744 A | 3/1997 |
| JP | 11-085985 A | 3/1999 |
| JP | 2004-093338 A | 3/2004 |

OTHER PUBLICATIONS

Chai, Xiujuan et al., "Pose Estimation Based on Gaussian Error Models," International Conference on Biometrics (ICB 2006), LNCS 3832, pp. 136-143, 2005.

Chen, Yang et al., "Object Modeling by Registration of Multiple Range Images," Proc. 1991 International Conference on Robotics and Automation (ICRA '91), pp. 2724-2729, 1991.

Wheeler, M.D. et al., "Consensus Surfaces for Modeling 3D Objects From Multiple Range Images," Proc. 6th International Conference on Computer Vision (ICCV'98), pp. 917-924, 1998.

Hartley R. et al., "Multiple View Geometry in Computer Vision," Second Edition, Chapter 4: "Estimation-2D Projective Transformation," Cambridge University Press, 2000.

Liu, Yuncai et al., "Determination of Camera Location From 2-D to 3-D Line and Point Correspondences," IEEE Transactions on Pattern Analysis and Machine Intelligence, vol. 12, No. 1, pp. 28-37, 1990.

Raj Talluri, et al., " Mobile Robot Self-Location Using Model-Image Feature Correspondence;" IEEE Transactions on Robotics and Automation; February 1996; Vol. 12, No. 1, pp. 63-77.

* cited by examiner

Fig. 6

| LINE SEGMENT POSITION | DIVISION POINT POSITION (A) | RELIABILITY (A) |
| --- | --- | --- |
| | DIVISION POINT POSITION (B) | RELIABILITY (B) |
| | ⋮ | ⋮ |
| | DIVISION POINT POSITION (A) | RELIABILITY (A) |

POSITION AND ORIENTATION ESTIMATION METHOD AND APPARATUS THEREFOR

TECHNICAL FIELD

The present invention relates to a technique for estimating the position and orientation of an object whose three-dimensional shape is known.

BACKGROUND ART

A complicated task which has been performed until now by a human such as an assembly of manufactured products is being performed by a robot instead along with the development of a robotic technique in recent years. Such a robot grasps a component with an end effector such as a hand and performs assembly. In order that the robot grasps the component, it is necessary to accurately estimate a relative position and orientation between the component to be grasped and the robot (a hand). Such an estimation of position and orientation is variously used for the robot not only to grasp the component, but to estimate its own position to autonomously move and to register a real space in augmented reality with a virtual object.

A method for estimating the position and orientation includes the one using a two-dimensional image captured by a camera or a range image acquired from a distance sensor. Among other things, an estimation using a model fitting in which a three-dimensional geometric model of an object is fitted to an image feature extracted from a captured image or point cloud data acquired from a range image is generally used. For example, there is a method for estimating the position and orientation of an object so that a projection image of a wire frame model of an object is fitted to an edge detected on a gray-scale image. Furthermore, there is another method for estimating the position and orientation of an object by fitting a three-dimensional geometric model such as a mesh model to point cloud data acquired from a range image.

In general, a shape and size of a mass-produced industrial component disperses due to a problem of machining accuracy and cost. It is unrealistic to produce a three-dimensional geometric model for each individual of such a component, so that the position and orientation are generally estimated by using one three-dimensional geometric model representing a standard shape of a component. In other words, the three-dimensional geometric model does not always agree with an actual component in shape. If the position and orientation of the component are estimated by using the model fitting, a problem is caused in that an accurate estimation cannot be made in a case where a difference between the model and the actual component is large.

Patent Literature 1 discusses a method for absorbing a dispersion of shape of an object in recognizing the position of the object using the model. In this method, the position of the object is realized based on a standard model representing the object and an image (measurement data), and the measurement data is statistically processed to sequentially update the standard model.

Non Patent Literature 1 discusses a method for absorbing a difference between an individual and a three-dimensional model of a face in estimating the position and orientation of the face. In this method, a deviation of a feature point for each individual is acquired from the distribution of a previously acquired deviation and actual measurement data, and the feature point provided with the deviation is subjected to the model fitting. A model is produced for each individual to allow estimating the position and orientation independently of the dispersion of a shape.

In Patent Literature 1, the dispersion of shape of the object is absorbed to improve the recognition rate of the object. The method updates the standard model so as to absorb the dispersion of an actual object, so that the method is suited for recognizing the object and roughly estimating the position and orientation but not suited for accurately estimating the position and orientation.

The method discussed in Non Patent Literature 1 is the one for explicitly calculating a deviation and may contain errors in the acquired deviation itself due to a false detection of a feature from the measurement data, so that the method is not suited for accurately estimating the position and orientation.

CITATION LIST

Patent Literature

[PTL 1] Japanese Patent Application Laid-Open No. 09-81744

Non Patent Literature

[NPL 1] X. Chai, Shan, L. Qing, and W. Gao, "Pose estimation based on Gaussian error models," International Conference on Biometrics (ICB 2006), LNCS 3832, pp. 136-143, 2005.

[NPL 2] Y. Chen and G. Medioni, "Object modeling by registration of multiple range images," Proc. 1991 International Conference on Robotics and Automation (ICRA'91), pp. 2724-2729, 1991.

[NPL 3] M. D. Wheeler, Y. Sato, and K. Ikeuchi, "Consensus surfaces for modeling 3D objects from multiple range images," Proc. 6th International Conference on Computer Vision (ICCV'98), pp. 917-924, 1998.

[NPL 4] R. Hartley and A. Zisserman, "Multiple View Geometry in Computer Vision, Second Edition," Cambridge University Press, 2000.

[NPL 5] Y. Liu, T. S. Huang, and O. D. Faugeras, "Determination of Camera Location from 2-D to 3-D Line and Point Correspondences," IEEE Transactions on Pattern Analysis and Machine Intelligence, vol. 12, no. 1, pp. 28-37, 1990.

SUMMARY OF INVENTION

The present invention is directed to a method for accurately estimating the position and orientation of an object even if the object is more dispersive in shape than a three-dimensional geometric model with a standard shape.

According to an aspect of the present invention, a position and orientation estimation method for obtaining a position and orientation of an object includes a statistic calculation step of, via statistic calculation means, calculating a statistic of deviation of a geometric feature constituting a three-dimensional geometric model of the held object, a reliability calculation step of, via reliability calculation means, calculating a reliability for each geometric feature based on the statistic of deviation, an image feature extraction step of, via image feature extraction means, extracting an image feature of a captured image captured by image capture means, an association step of, via association means, associating the geometric feature with the image feature, a deviation-amount calculation step of, via deviation-amount calculation means, calculating an amount of deviation between the geometric feature and the image feature, and a position and orientation estimation step of, via position and orientation estimation means, estimating the position and orientation of the object based on the reliability and the amount of deviation.

According to another aspect of the present invention, a position and orientation estimation apparatus for obtaining a position and orientation of an object includes statistic calculation means configured to calculate a statistic of deviation of a geometric feature constituting a three-dimensional geometric model of the object, reliability calculation means configured to calculate a reliability for each geometric feature based on the statistic of deviation, image feature extraction means configured to extract an image feature of a captured image captured by image capture means, association means configured to associate the geometric feature with the image feature, deviation-amount calculation means configured to calculate an amount of deviation between the geometric feature and the image feature, and position and orientation estimation means configured to estimate the position and orientation of the object based on the reliability and the amount of deviation.

According to a yet another aspect of the present invention, a program causes a computer to execute each step of one of the position and orientation estimation methods described above.

According to a yet another aspect of the present invention, a storage medium stores a program for causing a computer to execute each step of one of the position and orientation estimation methods described above.

Further features of the present invention will be apparent from the following description of exemplary embodiments with reference to the attached drawings.

BRIEF DESCRIPTION OF DRAWINGS

FIG. 6 is an example of an extracted line segment and a reliability database.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Exemplary Embodiments of the present invention will now be described in detail below with reference to the accompanying drawings.

In a first exemplary embodiment of the present invention, the position and orientation of an object is accurately estimated by use of ununiformity in deviation between a three-dimensional geometric model representing a standard shape of an object (hereinafter referred to as a standard model) and an actual object. Information of a part regarded as small in deviation is positively used to accurately estimate the position and orientation. In the present exemplary embodiment, an object is assumed to be an industrial component, the statistic of deviation of each feature constituting the standard model of the object is estimated based on tolerance data of the object, and the position and orientation of the object is estimated based on the statistic of deviation using a reliability for each feature calculated.

Figure 1:
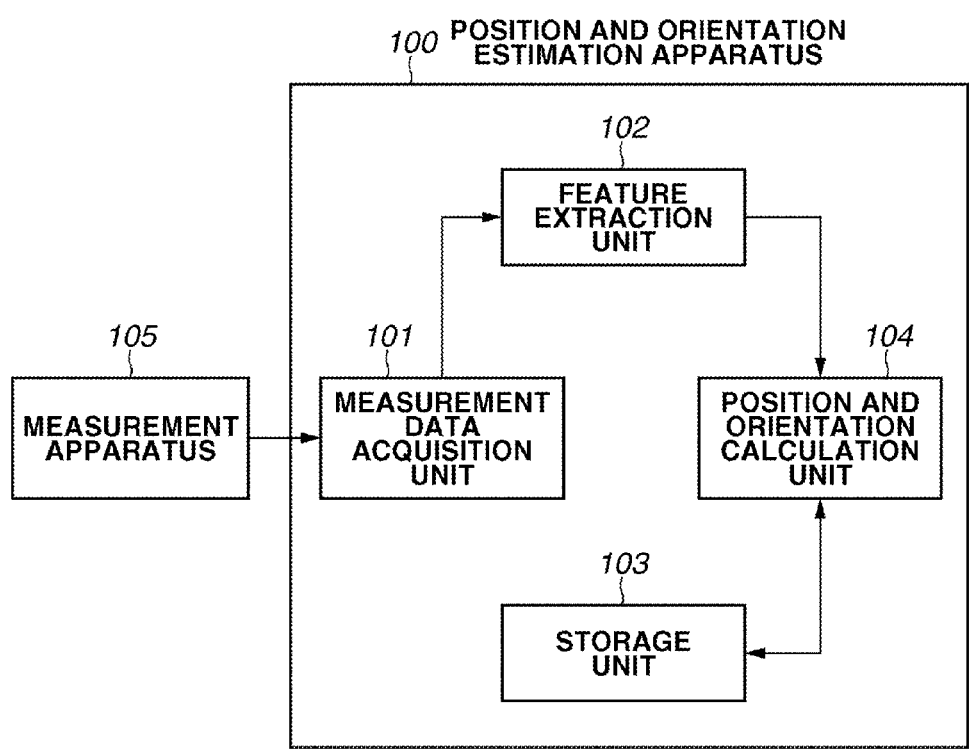
FIG. 1 is an example of a configuration in a first exemplary embodiment.

The configuration of a position and orientation estimation apparatus 100 in the present exemplary embodiment is described below using FIG. 1. In FIG. 1, an arrow indicates the flow of data. The position and orientation estimation apparatus 100 includes a measurement data acquisition unit 101, a feature extraction unit 102, a storage unit 103, and a position and orientation calculation unit 104. The position and orientation estimation apparatus 100 is connected to a measurement apparatus 105.

The measurement apparatus 105 measures a real space. The measurement apparatus 105 captures a two-dimensional image via a camera, for example. The measurement apparatus 105 measures a three-dimensional position of the surface of an object, for example, and captures a range image. The captured image is sent to the measurement data acquisition unit 101.

The measurement data acquisition unit 101 acquires measurement data from the measurement apparatus 105. For example, the measurement data is acquired as a two-dimensional image captured by the camera. The acquired measurement data are sent to the feature extraction unit 102.

The feature extraction unit 102 extracts a feature from the measurement data. The feature extraction unit 102 extracts an edge from an image as a feature using a Canny operator, for example. The extracted feature is sent to the position and orientation calculation unit 104.

The storage unit 103 stores the statistic of deviation of each feature constituting the standard model of the object. The standard model of the object is described with a set of line segments, for example. The line segment refers to an intersection of surfaces representing the surface of an object and a border line at which color or density is significantly changed. Alternatively, the standard model of the object may be described with a set of characteristic points on an object, a set of surfaces representing an object, or a combination of the sets. The standard model of the held object is sent to the position and orientation calculation unit 104.

The position and orientation calculation unit 104 estimates the position and orientation of an object using the feature extracted from the measurement data by the feature extraction unit 102 and the statistic of deviation from the standard model of the object and the standard model of each feature of an object stored in the storage unit 103.

The outline of a general process flow of the position and orientation estimation apparatus 100 in the present exemplary embodiment is described below with reference to FIG. 2.

The processing in step S201 is the one for calculating a statistic. In this step, the statistic of deviation of a geometric feature constituting the standard model of the object is calculated. As described above, in the present exemplary embodiment, the standard model of the object is described with set of line segments. Here, the statistic of deviation is calculated based on the tolerance at a division point where each line segment is three-dimensionally divided at a regular interval with the geometric feature as a line segment. The reason why the division point is used as the geometric feature is that a division point unit process is performed in a position and orientation estimation process described below.

The processing in step S202 is the one for calculating a reliability. In this step, the reliability of the division point being a geometric feature is calculated from the statistic of deviation at each division point acquired in step S201.

The processing in step S203 is the one for calculating a position and orientation. In this step, the position and orientation of an object is calculated using the reliability calculated in step S202.

The steps S201 and S202 do not always need to be performed with the estimation of the position and orientation and may be performed on a separate off-line as pre-processing of the position and orientation estimation performed in step S203.

The process for calculating the statistic of deviation from a division point in step S201 is described in detail below. A result of calculating the statistic of deviation is stored in the storage unit 103. Here, a method for calculating the statistic of deviation from the tolerance data of an object is described below with reference to a flow chart in FIG. 3.

The processing in step S301 is the one for extracting a feature of a model. In this step, line segment data is extracted from the standard model.

The processing in step S302 is the one for extracting a tolerance. In this step, a tolerance which could be a factor in deviation (hereinafter referred to as a deviation factor tolerance) of a line segment of interest (hereinafter referred to as a line segment of interest) is extracted. The deviation factor tolerance is a tolerance of a ridge or a surface in which the line segment of interest is included.

Figure 4:
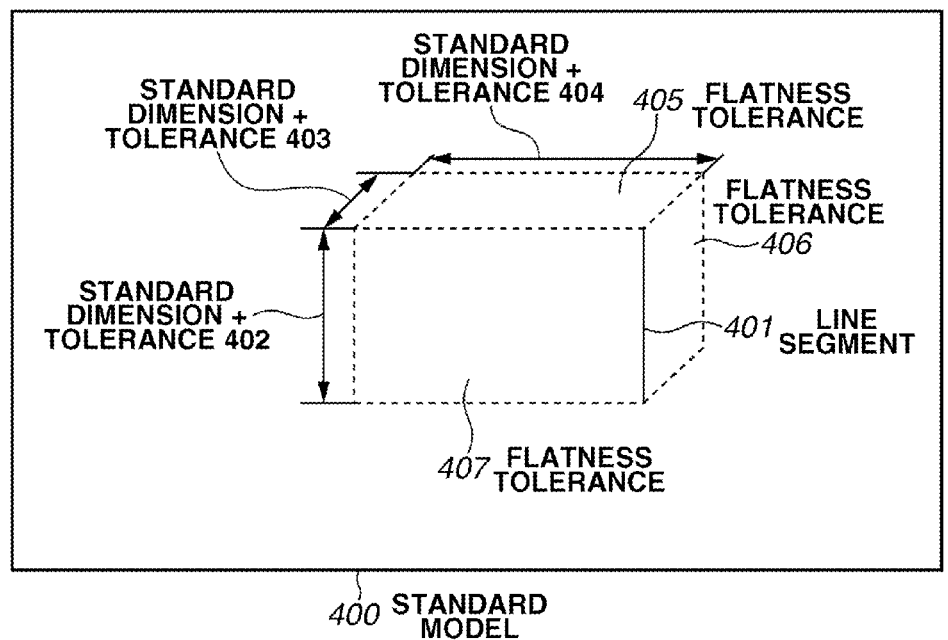
FIG. 4 is an example of a standard model and tolerance data.

FIG. 4 is an example of a standard model and tolerance data. The following description is made with a line segment 401 extracted from a standard model 400 as a line segment of interest.

Dimensional tolerances 402 to 404 and plane tolerances 405 to 407 which are tolerances of a ridge or a surface in which the line segment 401 is included are candidates for the deviation factor tolerance. Among those candidates, dimensional tolerances 403 and 404 and plane tolerances 406 and 407 excluding the dimensional tolerance 402 and the plane tolerance 405, which do not contribute to the position and orientation estimation, are the deviation factor tolerances.

The processing in step S303 is the one for calculating a tolerance. In this step, a line segment of interest is three-dimensionally divided at a predetermined interval, and the maximum value of the amount of deviation (hereinafter referred to as the amount of deviation candidate) caused by each deviation factor tolerance extracted in step S302 is acquired with respect to each division point. The amount of deviation candidate is represented by a magnitude for each component of a model coordinate system 503 set on the standard model.

Figure 5:
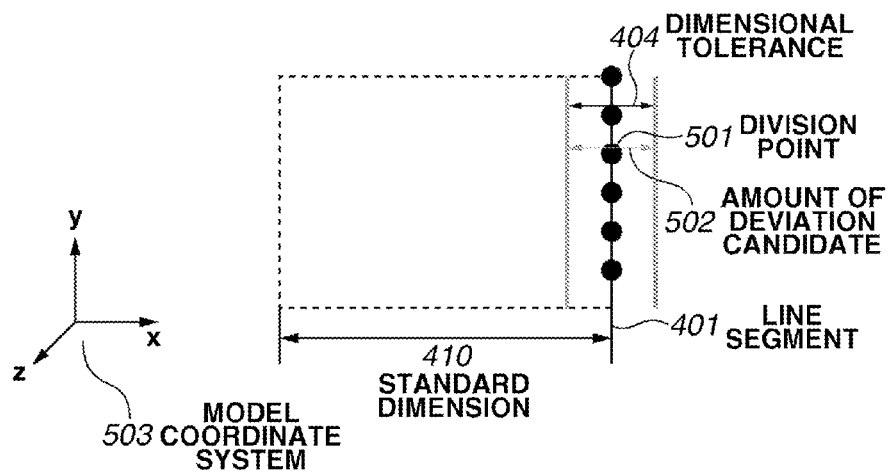
FIG. 5 is a schematic diagram representing the amount of deviation candidate.

FIG. 5 is a schematic diagram representing the amount of deviation candidate 502 which the dimensional tolerance 404 provides for a division point 501 on the line segment 401 with the line segment of interest as the line segment 401. In this example, the amount of deviation candidate 502 at the division point 501 is present only in an x component. All the division points are subjected to this processing.

The processing in step S303 is the one for determining a statistic. In this step, a vector with the maximum value for each component of a group of the amount of deviation candidate at each division point calculated in step S303 is generated, and the magnitude "d" of the vector is taken as the statistic of deviation at a division point. This results in acquiring the amount of deviation that satisfies all the tolerances and is the largest in the tolerances.

There is described below a case where three amounts of deviation candidate, for example, exist at the division point 501. The amounts of deviation candidate are taken as (component x, component y, and component z)=(dx1, dy1, dz1), (dx2, dy2, dz2), (dx3, dy3, dz3). The components x, y, and z have a relationship: dx1>dx2>dx3, dy3>dy2>dy1, and dz2>dz3>dz1. In this case, the maximum value for each component is given by (dx1, dy3, dz2), and the magnitude "d" thereof is expressed by the following equation:

$$d=\sqrt{d_{x1}^2+d_{y3}^2+d_{z2}^2} \quad \text{[Math. 1]}$$

where, "d" is taken as the statistic of deviation at the division point 501.

In step S305, if all the line segments extracted in step S301 have already been subjected to the processing in steps S302 to S304, the processing is completed. If not, the processing proceeds to step S306 to change a line segment of interest and returns to step S302.

A method of calculating a reliability for each division point performed in step S202 is described below.

The smaller the statistic of deviation, the higher the reliability is set. More specifically, the higher the reliability is set at a portion high in machining accuracy, the lower the reliability is set at a portion low in machining accuracy. For example, a function in which the smaller the statistic of deviation, the higher the reliability is defined by the following equation (1):

[Math. 2]

$$h(d) = \begin{cases} \dfrac{1}{d+1} & d \le c_1 \\ 0 & d > c_1 \end{cases} \quad (1)$$

In equation (1), "d" is the statistic of deviation at the foregoing division point and $c_1$ is a constant. The function providing a reliability is not limited to the above function, but may be any other function in which the smaller the amount of deviation, the higher the reliability. The calculated reliability is stored in the storage unit 103 along with a three-dimensional position at the division point extracted from the standard model for each line segment as a database (FIG. 6).

Figure 7:
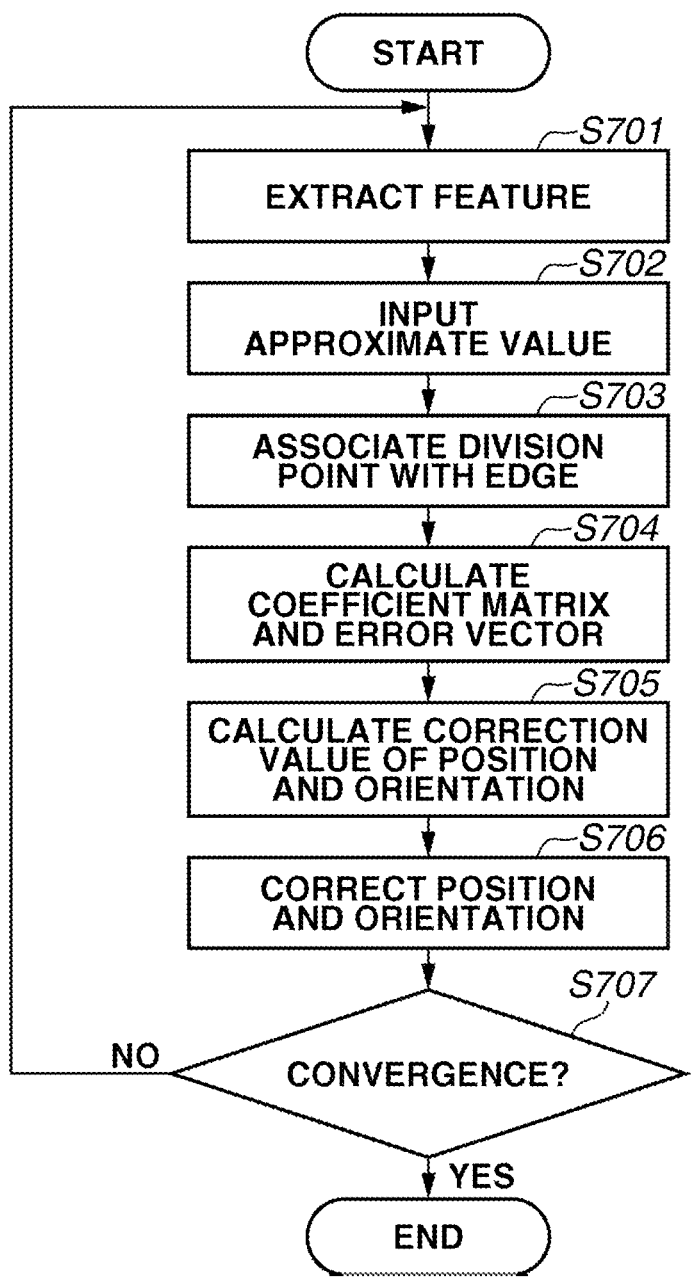
FIG. 7 is a flow chart illustrating an example of processing for calculating the position and orientation of an object.

The processing for calculating the position and orientation of an object performed in step S203 is described below with reference to the flow chart of FIG. 7.

The processing in step S701 is the one for extracting an image feature. In this step, the feature extraction unit 102 extracts an edge being an image feature from a captured image.

The processing in step S702 is the one for inputting an approximate value. In this step, the approximate value of the position and orientation of the standard model is input.

Figure 8:
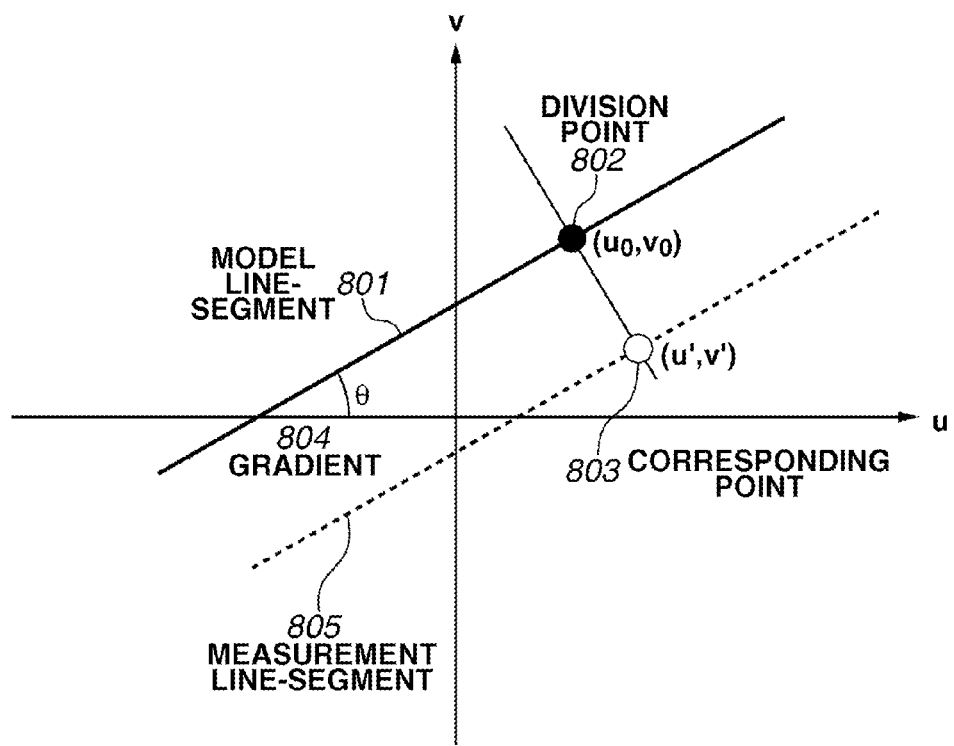
FIG. 8 is a schematic diagram (1) illustrating an example of association.

The processing in step S703 is the one for association. In this step, the division point stored in the storage unit 103 is associated with the edge extracted in step S701. FIG. 8 is a schematic diagram illustrating how association is performed.

Here, a line segment 801 in the standard model and a division point 802 thereof are projected on an image using the input approximate value of the position and orientation, an edge is searched within a regular range in the direction normal to the line segment projected for each division point, and the most adjacent edge is taken as a point 803 corresponding to the division point.

The processing in step S704 is the one for calculating a value for correcting the position and orientation. In this step, a coefficient matrix and an error vector for calculating the position and orientation in the position and orientation calculation unit 104 are calculated using a reliability at each division point 802. A projection position on an image at a division point is taken as (ui, 0, vi, 0), and a detection point on an image at a point corresponding to the division point 802 is taken as (ui', vi'). A gradient 804 on the image of the projection image of the line segment 801 on the standard model (hereinafter referred to as a model line segment) including a division point (ui, 0, vi, 0) is taken as θ. An equation of a straight line 805 which passes through the corresponding point 803 and whose gradient 804 is θ is expressed by formula (2):

[Math. 3]

$$u_i \sin \theta_i - v_i \cos \theta_i = d_i \quad (2)$$

where, θ is a constant. Here, $d_i$ (constant) is expressed by $$d_i = u'_i \sin \theta_i - v'_i \cos \theta_i \quad \text{[Math. 4]}$$

The relationship between the projection position on an image of the division point 802 and the position and orientation of an object is represented by the following equations:

[Math. 5]

$$u_{i,0} = u(\bar{s})$$
$$v_{i,0} = v(\bar{s}) \quad (3)$$

If a small change in the position and orientation of the object is taken as Δs, the equation (3) can be linearly approximated by the following equation (4):

[Math. 6]

$$u_i(\bar{s} + \Delta s) \approx u_{i,0} + \sum_{n=1}^{6} \frac{\partial u_i}{\partial s_n} \Delta s_n$$
$$v_i(\bar{s} + \Delta s) \approx v_{i,0} + \sum_{n=1}^{6} \frac{\partial v_i}{\partial s_n} \Delta s_n \quad (4)$$

If the projection position at the division point expressed by equation (4) lies on the straight line expressed by equation (2) when the position and orientation of the object is changed only by Δs, an equation expressed by equation (5) with respect to Δs can be obtained:

[Math. 7]

$$\sin \theta_i \sum_{n=1}^{6} \frac{\partial u_i}{\partial s_n} \Delta s_n - \cos \theta_i \sum_{n=1}^{6} \frac{\partial v_i}{\partial s_n} \Delta s_n = d_i - r_i \quad (5)$$

where, $r_i$ is a constant:

$$r_i = u_{i,0} \sin \theta_i - v_{i,0} \cos \theta_i \quad \text{[Math. 8]}$$

The equation (5) holding with respect to each division point 802 of the line segment 801 in the standard model is solved as a simultaneous equation to obtain a correction value Δs of the position and orientation of the object. Since a rigid-body transformation based on the position and orientation and the transformation of perspective projection onto an image are a non-linear transformation, the calculation of the correction value Δs and the correction of "s" are repeated to obtain the final position and orientation of the object.

In the present exemplary embodiment, both sides of the equation (5) are multiplied by a reliability $h_i$ of the division point as a weight to calculate the correction value Δs of the position and orientation with contribution increased at the division point high in machining accuracy and with contribution decreased at the division point low in machining accuracy. In other words, the simultaneous equation expressed by equation (6) is solved to calculate the correction value Δs of the position and orientation.

[Math. 9]

$$\begin{bmatrix} h_1\left(\sin\theta_1 \frac{\partial u_1}{\partial s_1} - \cos\theta_1 \frac{\partial v_1}{\partial s_1}\right) & \cdots & h_1\left(\sin\theta_1 \frac{\partial u_1}{\partial s_6} - \cos\theta_1 \frac{\partial v_1}{\partial s_6}\right) \\ h_2\left(\sin\theta_2 \frac{\partial u_1}{\partial s_1} - \cos\theta_1 \frac{\partial v_1}{\partial s_1}\right) & \cdots & h_2\left(\sin\theta_2 \frac{\partial u_1}{\partial s_2} - \cos\theta_1 \frac{\partial v_1}{\partial s_1}\right) \\ \vdots & \ddots & \vdots \end{bmatrix} \quad (6)$$

$$\begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} h_1(d_1 - r_1) \\ h_2(d_2 - r_2) \\ \vdots \end{bmatrix}.$$

where, equation (6) is expressed by the following equation (7):

[Math. 10]

$$J \Delta s = R \quad (7)$$

An approximate position and orientation is corrected using the correction value Δs obtained by solving equation (7) to calculate the position and orientation of the object.

In step S705, both sides of equation (7) are multiplied by a generalized inverse matrix $(J^T \cdot J)-1 \cdot J^T$ of a matrix J to obtain the correction value Δs of the position and orientation.

[Math. 11]

$$\Delta s = (J^T J)^{-1} J^T R \quad (8)$$

The processing in step S706 is the one for correcting the position and orientation. In this step, the approximate value of the position and orientation is corrected by the calculated correction value Δs of the position and orientation.

$$\Delta s \leftarrow s + \Delta s \quad \text{[Math. 12]}$$

In step S707, convergence is determined. If the convergence is performed (YES in step S707), the processing is completed. If not (NO in step S707), the processing returns to step S701. In the convergence determination, if the correction value Δs is nearly zero or if the sum of square of an error vector R is little changed between before and after the correction, it is determined that the convergence is performed.

As described above, in the first exemplary embodiment, there is described a method for obtaining the position and orientation of an object, in which the statistic of deviation of a geometric feature constituting a standard model is obtained from tolerance data, and the smaller the statistic of deviation in the feature is, the larger the weight to be provided becomes. Positively using a feature which is high in reliability allows accurately estimating the position and orientation.

In the first exemplary embodiment, the statistic of deviation of the geometric feature constituting the object from the standard model is calculated as a specific value based on the maximum deviation calculated from the tolerance. However, in general, the deviation of an object statistically occurs and a feature occurs in which reliability is determined based on the maximum deviation to lower the reliability beyond expectations. On the other hand, an actual tolerance generally forms a normal distribution with a standard value as a center. For this reason, the tolerance is not a difference with respect to a standard and can be represented by a probability distribution like a normal distribution. In a second exemplary embodiment of the present invention, a method of estimating a position and orientation, in which the deviation of a feature constituting the standard model is represented by a probability distribution, is described below.

Figure 2:
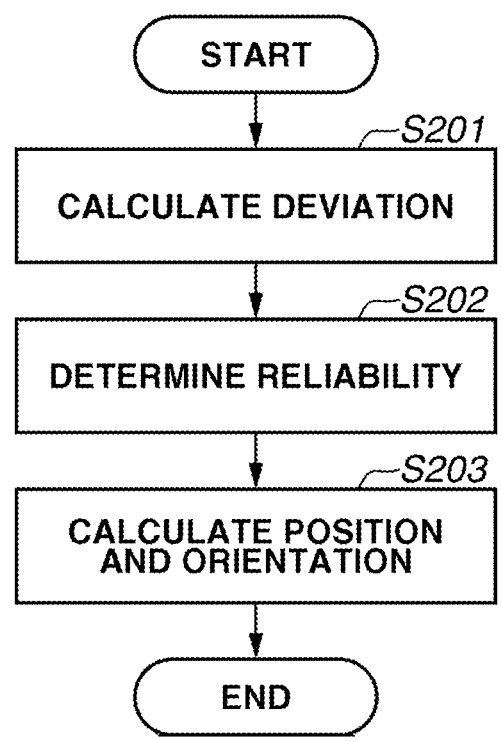
FIG. 2 is a flow chart of processes in the first exemplary embodiment.

The general process flow is similar to that described in the first exemplary embodiment using FIG. 2. In the following, the processing performed in steps S201, S202, and S203 is described.

Figure 3:
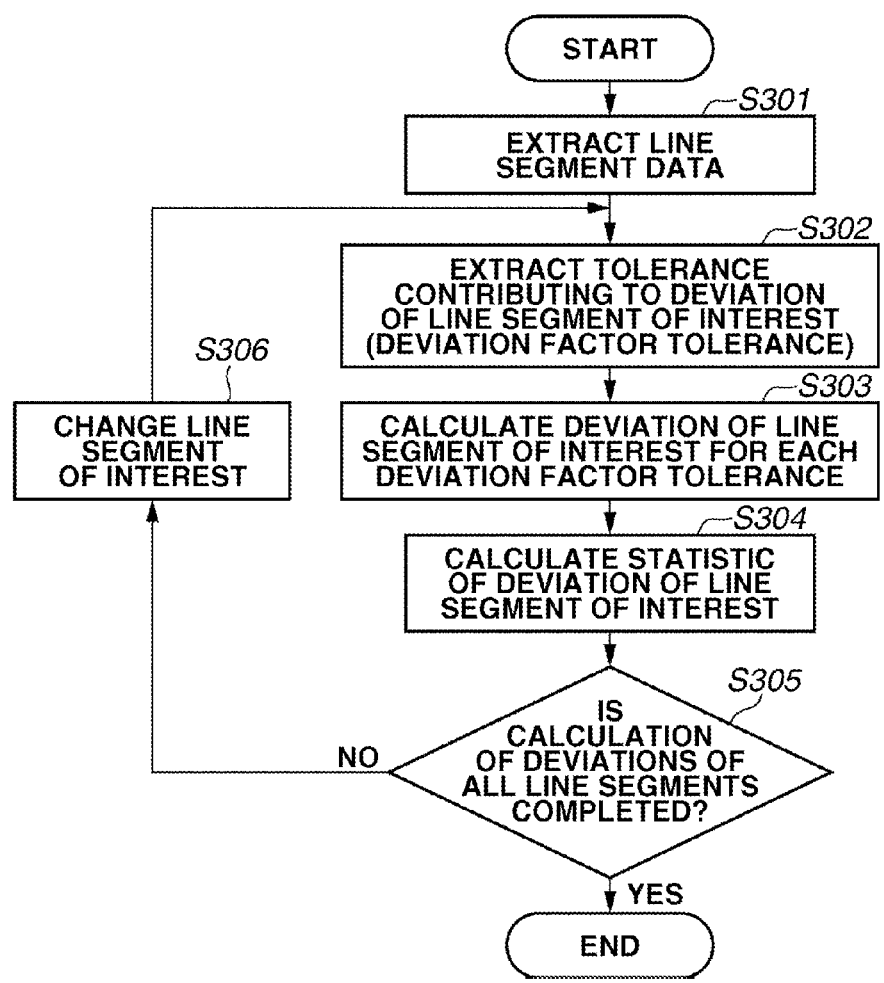
FIG. 3 is a flow chart (1) illustrating an example of a process for calculating the deviation of a shape from tolerance data.

The processing for calculating a deviation from the standard model performed in step S201 is described below using FIG. 3. The processes except step S304 are similar in contents to those described in the first exemplary embodiment, so that only the process in step S304 is described.

In step S304, the distribution of a deviation for each component is obtained from a group of amounts of deviation candidates at each division point calculated in step S303. The distribution of a deviation at each division point is independent between components and follows a one-dimensional normal distribution in which an average is zero for each component and a standard deviation is one third of the maximum value of the group of amounts of deviation candidates. A case where three amounts of deviation candidates exist at the division point 501 is described as an example. Suppose that the amounts of deviation candidates (component x, component y, component z) are taken as (dx1, dy1, dz1), (dx2, dy2, dz2), (dx3, dy3, dz3) and have a relationship in which dx1>dx2>dx3, dy3>dy2>dy1, and dz2>dz3>dz1. In this case, the maximum value of each component is (dx1, dy3, dz2), and the standard deviation of a deviation is (σx, σy, σz)=(dx1/3, dy3/3, dz2/3). Thereby, the probability distribution of a deviation for each component is expressed by the following equation:

[Math. 13]

$$\left( \frac{1}{\sqrt{2\pi}\,\sigma_x} \exp\left(-\frac{x^2}{2\sigma_x^2}\right),\ \frac{1}{\sqrt{2\pi}\,\sigma_y} \exp\left(-\frac{y^2}{2\sigma_y^2}\right),\ \frac{1}{\sqrt{2\pi}\,\sigma_z} \exp\left(-\frac{z^2}{2\sigma_z^2}\right) \right)$$

The processing for calculating the reliability and the processing for estimating the position and orientation, which are performed in steps S202 and S203, respectively, are described below. A maximum likelihood estimation method used in a case where a statistical error is included both in the standard model and in the measurement data is described first. Then, as is the case with the first exemplary embodiment, a case where the geometric feature is taken as the division point of a line segment is described in detail.

In the following, the maximum likelihood estimation method used in a case where a statistical error is included in the standard model and the measurement data is described.

A likelihood function indicating how well measurement data is fitted is calculated. A vector indicating the feature position of the measurement data is taken as pi, a vector indicating the feature position of the standard model corresponding to the vector pi is taken as qi, and a six-dimensional vector indicating the position and orientation of an object is taken as s. Suppose that the feature position of the measurement data pi, the feature position of the standard model qi, and the position and orientation of an object s have a relationship expressed by equation (9). A function g includes the perspective projection transformation in which a three-dimensional space is transformed into a two-dimensional space and a model view transformation in which a model coordinate system is transformed into a camera coordinate system.

[Math. 14]

$$g(q_i, s) = p_i \quad (9)$$

If the deviation of the standard model is taken as Δqi and a measurement error is taken as Δpi, an error ei between the features of the standard model and measurement data in a measurement data space is linearly approximated by the following equation (10):

[Math. 15]

$$\begin{aligned} e_i &= p_i + \Delta p_i - g(q_i + \Delta q_i, s) \\ &\approx p_i + \Delta p_i - g(q_i, s) - \frac{\partial g}{\partial q_i} \Delta q_i \\ &= \Delta p_i - \frac{\partial g}{\partial q_i} \Delta q_i \end{aligned} \quad (10)$$

If Δqi and Δpi are statistical errors, the error ei includes a statistical error in which an average is zero and dispersion is represented by the following equation (11):

[Math. 16]

$$\sum_i = \sum_{p_i} + \left[\frac{\partial g}{\partial q_i}\right] \sum_{q_i} \left[\frac{\partial g}{\partial q_i}\right]^T \quad (11)$$

If Δqi and Δpi follow a normal distribution, the statistical error included in the error ei also follows a normal distribution, so that the likelihood function of the error ei is expressed by the following equation (12):

[Math. 17]

$$f(e_i) = \frac{1}{(2\pi)^{3/2} \sqrt{\Sigma_i}} \exp\left(-\frac{1}{2} e_i^T \sum_i^{-1} e_i\right) \quad (12)$$

In a maximum likelihood estimation, the position and orientation of the object is estimated so that the product of the likelihood expressed by the following equation (13) is maximized:

[Math. 18]

$$L = \prod_{i=1}^{M} f(e_i) = \left(\frac{1}{(2\pi)^{3/2}\sqrt{|\Sigma_i|}}\right)^M \exp\left(\sum_{i=1}^{M}\left(-\frac{1}{2}e_i^T \sum_i^{-1} e_i\right)\right) \quad (13)$$

Actually, equation (13) is replaced with an question minimizing equation (14) in which the logarithm of product of the likelihood is taken and the sine thereof is reversed.

[Math. 19]

$$-\log(L) = -\log\left(\frac{1}{(2\pi)^{3/2}\sqrt{|\Sigma_i|}}\right)^M + \frac{1}{2}\sum_{i=1}^{M}\left(e_i^T \sum_i^{-1} e_i\right) \quad (14)$$

In equation (14), the first term thereof is a constant independent of the position and orientation, so that equation (14) is finally turned into a question minimizing the following equation (15).

[Math. 20]

$$E = \frac{1}{2}\sum_{i=1}^{M}\left(e_i^T \sum_i^{-1} e_i\right) \quad (15)$$

Equation (15) represents the sum of square of norm of an error vector in which the inverse matrix of a dispersion $\Sigma i$ is weighted as reliability.

In the following is described a case where the geometric feature is taken as the division point of a line segment.

The function g of equation (9) is the one that projects the division point onto an image surface and is expressed by the following equation (16):

[Math. 21]

$$g(q_i, s) = g_u(q_i, s)\sin\theta_i - g_v(q_i, s)\cos\theta_i \quad (16)$$

where

[Math. 22]

$$g_s(q_i, s) = f\frac{x_c}{z_c}$$
$$g_v(q_i, s) = f\frac{y_c}{z_c} \quad (17)$$

and

[Math. 23]

$$\begin{bmatrix} x_c \\ y_c \\ z_c \\ 1 \end{bmatrix} = \begin{bmatrix} R & t \\ 0 & 1 \end{bmatrix}\begin{bmatrix} x_w \\ y_w \\ z_w \\ 1 \end{bmatrix} = \begin{bmatrix} r_{11}x_w + r_{12}y_w + r_{13}z_w + t_x \\ r_{21}x_w + r_{22}y_w + r_{23}z_w + t_y \\ r_{31}x_w + r_{32}y_w + r_{33}z_w + t_z \\ 1 \end{bmatrix} \quad (18)$$

In equations (17) and (18), f denotes the focal length of a camera, xc, yc, and zc indicate a three-dimensional position of a division point in the camera coordinate system, xw, yw, and zw signify the position of a division point in the world coordinate system (object centered coordinate system), and matrixes R and t mean the rotation and parallel translation components of a transformation matrix from the world coordinate system to the camera coordinate system, respectively.

The error ei is represented by a distance (a scalar) between the projection position of a division point and a straight line passing through a corresponding point. If an error is not included in a gradient θi of the straight line passing through the corresponding point, the error ei is expressed by the following equation (19):

[Math. 24]

$$e_i = g(q_i, s) - (u'_i\sin\theta_i - v'_i\cos\theta_i) \quad (19)$$
$$= g_u(q_i, s)\sin\theta_i - g_v(q_i, s)\cos\theta_i - (u'_i\sin\theta_i - v'_i\cos\theta_i)$$

The error ei is a scalar, so that a covariance matrix $\Sigma i$ of the error ei {equation (11)} is also a scalar. In step S202, a reliability is calculated as an inverse number of $\Sigma i$. In step S203, the flow described in the first exemplary embodiment using FIG. 7 is performed to obtain the position and orientation of the object. A coefficient extension matrix and an error vector calculated in step S704 are obtained by replacing the weight h in equation (6) with the inverse number of $\Sigma i$ calculated by equation (18).

A method for calculating a covariance matrix $\Sigma i$ with the geometric feature as the line segment is described in detail below.

$\Sigma pi$ of the first term on the right-hand side of the covariance matrix $\Sigma i$ in equation (11) is a covariance matrix of detection error of the line segment detected from an image. It is supposed that the detection error of the line segment has ambiguity only in the direction of a search line and follows a one-dimensional Gaussian distribution in which an average is zero and a standard deviation is σ. It is difficult to estimate σ in an actual image. For this reason, the detection error of the line segment is regarded as mainly resulting from a quantization error of an image and σ, for example, is set to one pixel. In other words, $\Sigma pi$ becomes 1. The second term on the right-hand side of the covariance matrix $\Sigma i$ in equation (11) is the one in which both sides of the covariance matrix $\Sigma qi$ of the standard model obtained in step S201 are multiplied by Jacobian $\partial g/\partial qi$. If the covariance matrix $\Sigma qi$ of a deviation of the standard model is regarded as not having a correlation between components and the standard deviation of a deviation obtained in step S201 is taken as (σx, σy, σz), the following equation (20) can be obtained.

[Math. 25]

$$\sum_{q_i} = \begin{bmatrix} \sigma_x^2 & 0 & 0 \\ 0 & \sigma_y^2 & 0 \\ 0 & 0 & \sigma_z^2 \end{bmatrix} \quad (20)$$

The Jacobian ∂g/∂qi can be written as equation (21) using equations (16), (17), and (18):

[Math. 26]

$$\frac{\partial g}{\partial q_i} = \begin{bmatrix} \frac{\partial g}{\partial x_c}\frac{\partial x_c}{\partial x_w} + \frac{\partial g}{\partial y_c}\frac{\partial y_c}{\partial x_w} + \frac{\partial g}{\partial z_c}\frac{\partial z_c}{\partial x_w}, \cdots \\ \frac{\partial g}{\partial x_c}\frac{\partial x_c}{\partial z_w} + \frac{\partial g}{\partial y_c}\frac{\partial y_c}{\partial z_w} + \frac{\partial g}{\partial z_c}\frac{\partial z_c}{\partial z_w} \end{bmatrix} \quad (21)$$

$$= \frac{f}{z_c}\begin{bmatrix} \sin\theta_i r_{11} - \cos\theta_i r_{21} + \frac{(\cos\theta_i - \sin\theta_i)}{z_c}r_{31}, \cdots \\ \sin\theta_i r_{13} - \cos\theta_i r_{23} + \frac{(\cos\theta_i - \sin\theta_i)}{z_c}r_{33}, \end{bmatrix}$$

The second term on the right-hand side of the covariance matrix $\Sigma_i$ in equation (11) can be obtained using equations (20) and (21).

In the second exemplary embodiment is described a method for obtaining the position and orientation based on the reliability calculated from a probability distribution in a case where the deviation of a feature extracted from the standard model is represented by a probability distribution.

In the first and second exemplary embodiments, a method for obtaining the calculation of a deviation of a feature from the standard model performed in step S201 is used, but other methods may be used. For example, a large number of objects of the same type may actually be measured to obtain the dispersion of a shape. In the third exemplary embodiment, a three-dimensional shape measurement of a plurality of objects is performed by a distance imaging apparatus to obtain the deviation from the standard model based on the dispersion of results of the three-dimensional measurement of the objects. Each sample is three-dimensionally measured from a plurality of view points to measure the shape of the entire object, and the results are integrated to generate one standard model described by line segments. A deviation from the standard model is calculated from the thus generated plurality of standard models.

An object measuring step for measuring an object to obtain the standard model may be executed prior to step S201. The standard model of an object is regarded as being previously prepared, but it may be generated based on a plurality of standard models obtained from the results of the three-dimensional measurement.

Figure 9:
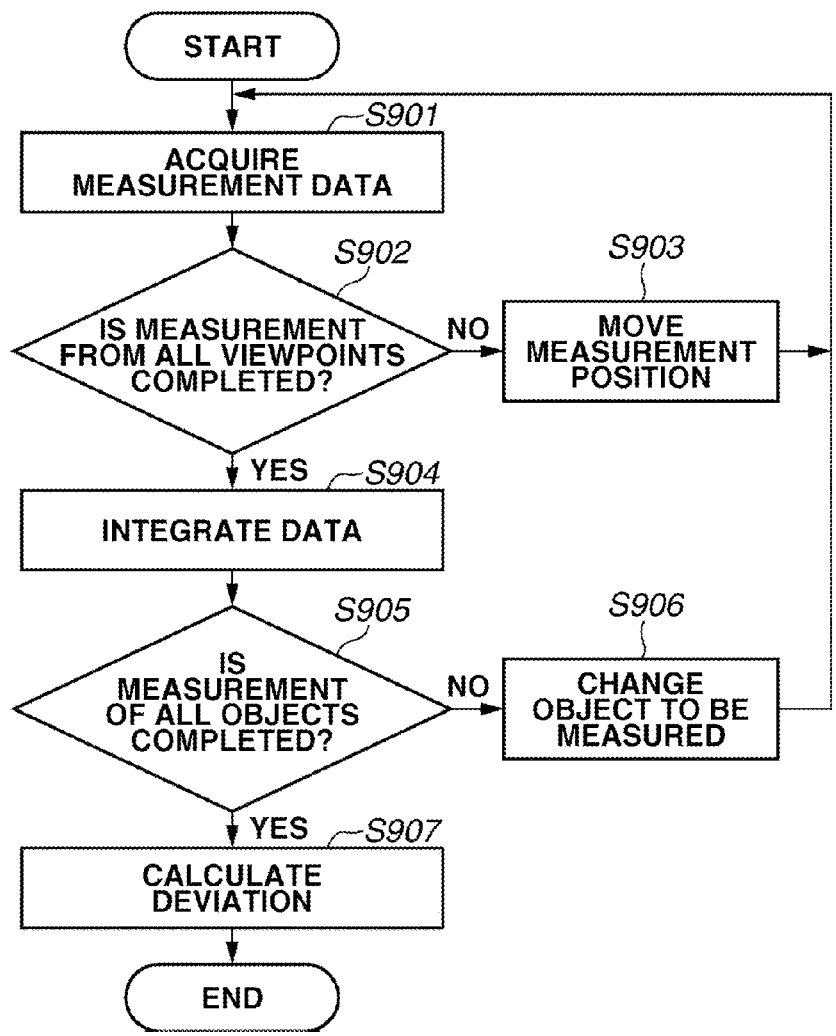
FIG. 9 is a flow chart illustrating an example of processing for calculating a deviation from measurement data.

A method for obtaining the deviation from the standard model by actually measuring an object using a flow chart in FIG. 9.

In step S901, the measurement data of an object is acquired at a measurement position by the distance imaging apparatus. Here, the measurement data of an object refers to point cloud data, and each point is represented by the three-dimensional position in the coordinate system of the distance imaging apparatus.

If measurements at all the predetermined measurement positions are not completed (NO in step S902), the processing proceeds to step S903.

Figure 10:
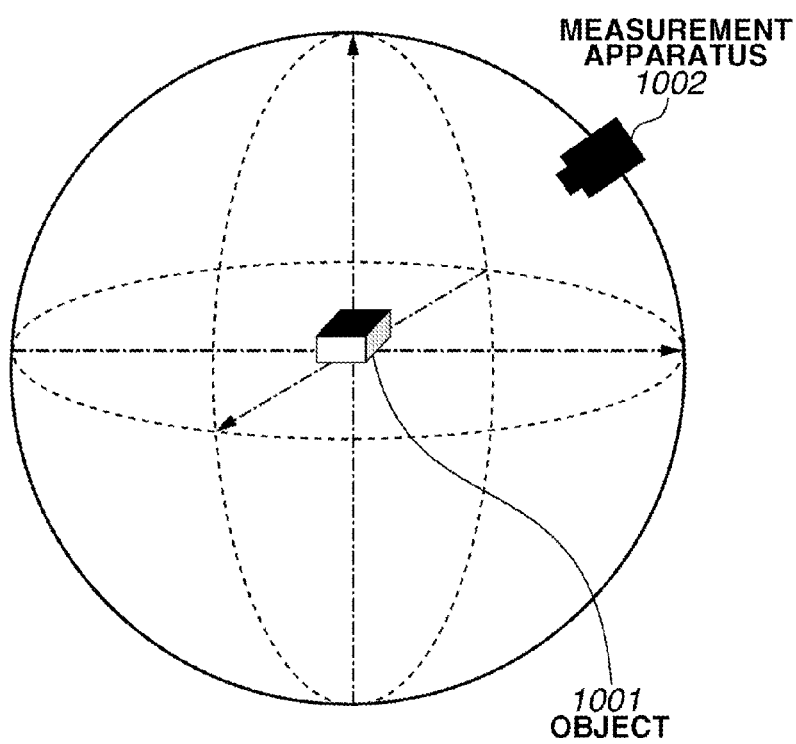
FIG. 10 is a diagram illustrating an example of a relationship between an object and a measurement position.

In step S903, the measurement position is moved. FIG. 10 is a schematic diagram illustrating the measurement position. A measurement apparatus 1002 is moved on a spherical surface with an object 1001 as an original point in appropriate increments to move the measurement position. After the measurement position is moved, the processing returns to step S901 to continue the processing. If measurements at all the predetermined measurement positions are completed (YES in step S902), the processing proceeds to step S904. Thereby, the object is measured a plurality of times from multiple directions to improve a measurement accuracy.

In step S904, the point cloud data acquired at a plurality of viewpoints are integrated into one point cloud data (refer to Non Patent Literature 2). The integrated point cloud data is converted into a mesh model (refer to Non Patent Literature 3). A three-dimensional line segment is extracted from the generated mesh model. The line of intersection of a mesh making an angle exceeding a certain value is extracted as a three-dimensional line segment.

If measurements of all the predetermined objects are not completed (NO in step S905), the processing proceeds to step S906.

In step S906, an object to be measured is changed. The above object refers to an object of the same kind and has a purpose to obtain information about deviation for each individual, and the object is changed. After the object is changed, the processing returns to step S901 to continue the processing. If measurements of all the predetermined objects are completed (YES in step S905), the processing proceeds to step S907.

In step S907, the deviation of a three-dimensional line segment from the standard model obtained from the results of measurement for each object is calculated. The identical three-dimensional line segment is regarded as being extracted from an individual mesh model. As is the case with the first and second exemplary embodiments, the deviation from the standard model is calculated for each division point obtained when the three-dimensional line segment is divided at a regular interval.

As described above, in the third exemplary embodiment is described the method for obtaining the dispersion of shape of an actual object from the standard model. This allows accurately estimating the position and orientation by estimating the dispersion by an actual measurement and using the result even if information about dispersion is not previously obtained as tolerance data.

In the first, second, and third exemplary embodiments, the method for describing the shape of an object as a set of line segments is described, but the shape of an object may be described by another feature in addition to the above. The shape of an object may be described as a set of points, for example. As is the case with the methods described in the first and second exemplary embodiments, dispersion from the standard model is calculated with respect to each point representing an object to use the dispersion as a weight in estimating the position and orientation of the object. Here, it is supposed that a scalar weight $h_i$ is calculated as is the case with the first exemplary embodiment. If the approximate position and orientation of the object is provided, the following observation equation holds with respect to the measurement data:

[Math. 27]

$$\sum_{n=1}^{6}\frac{\partial u}{\partial s_n}\Delta s_n = u'_i - u_i \quad (22)$$

$$\sum_{n=1}^{6}\frac{\partial v}{\partial s_n}\Delta s_n = v'_i - v_i$$

In equation (22), $u'_i$ and $v'_i$ are detection positions and $u_i$ and $v_i$ are positions of points on an image calculated by the approximate position and orientation.

The equation in which both sides of equation (22) holding with respect to all points are multiplied by the weight hi is taken as a simultaneous equation with respect to a correction value Δsi of the position and orientation to obtain equation (23):

[Math. 28]

$$\begin{bmatrix} h_1 \frac{\partial u_1}{\partial s_1} & h_1 \frac{\partial u_1}{\partial s_2} & \cdots & h_1 \frac{\partial u_1}{\partial s_6} \\ h_1 \frac{\partial v_1}{\partial s_1} & h_1 \frac{\partial v_1}{\partial s_2} & \cdots & h_1 \frac{\partial v_1}{\partial s_6} \\ h_2 \frac{\partial u_1}{\partial s_1} & h_2 \frac{\partial u_2}{\partial s_2} & \cdots & h_2 \frac{\partial u_2}{\partial s_6} \\ h_2 \frac{\partial v_2}{\partial s_1} & h_2 \frac{\partial v_2}{\partial s_2} & \cdots & h_2 \frac{\partial v_2}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} h_1(u_1' - u_1) \\ h_1(v_1' - v_1) \\ h_2(u_1' - u_1) \\ h_2(v_2' - v_2) \\ \vdots \end{bmatrix} \quad (23)$$

The process is repeated in which equation (23) is solved to calculate the correction value Δsi of the position and orientation to correct an approximate position and orientation, thereby calculating the final position and orientation of an object.

In the description of the first, second, and third exemplary embodiments, measurement data is taken as the second-dimensional image captured by a camera is used as, but the measurement data may be taken as the three-dimensional point cloud data acquired from the distance imaging apparatus. The process in which the measurement data is taken as the three-dimensional point cloud data is described below.

Figure 11:
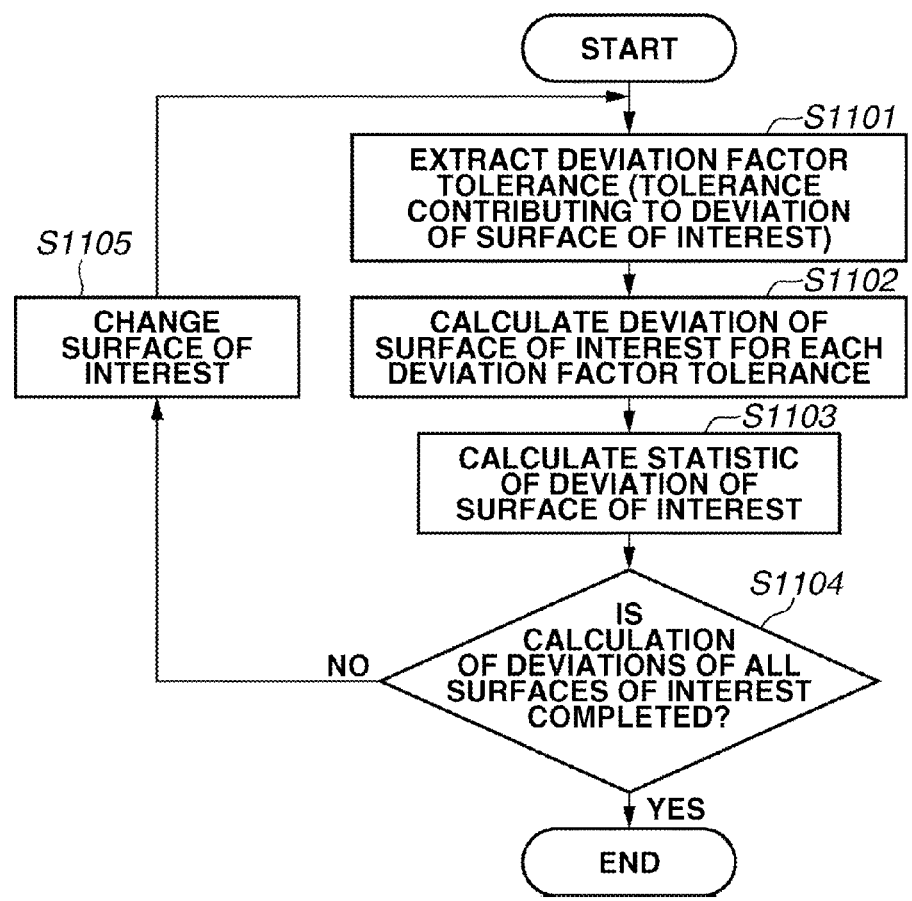
FIG. 11 is a flowchart (2) illustrating an example of a process for calculating the deviation of a shape from tolerance data.

A method for calculating a deviation using tolerance data, performed in step S201, is described with reference to FIGS. 10 and 11. Here, the standard model of an object is regarded as being described as a set of surfaces, and the statistic of deviation is set for each surface.

In step S1101, the deviation factor tolerance of a surface of interest is extracted. The deviation factor tolerance means tolerance for a ridge and a surface including the surface of interest. If a surface 1201 (FIG. 12) extracted from the standard model 400 is taken as a surface of interest, a remainder in which dimensional tolerances 402 and 403 and flatness tolerances 405 and 407 which provide an error in the direction orthogonal to a normal of a surface not contributing to a position and orientation estimation are subtracted from dimensional tolerances 402 to 404 and flatness tolerances 405 to 407, which are tolerances for a ridge and a surface including the surface 1201, in other words, the dimensional tolerance 404 and the flatness tolerance 406 become the deviation factor tolerance.

In step S1102, the maximum deviation (the amount of deviation candidate) which each deviation factor tolerance extracted in step S1102 provides for the surface of interest is obtained. The amount of deviation is taken as a deviation of center of gravity of a surface with respect to the standard model.

In step S1103, the maximum amount of deviation candidate among the deviation candidates of center of gravity of a surface currently interested with respect to the standard model is extracted as a statistic of deviation of the surface.

If it is determined that the process for all surfaces is completed (YES in step S1104), the process is ended. If not (NO in step S1104), the surface of interest is changed in step 1105 and the processing returns to step S1102.

A method for calculating reliability performed in step S202 is described below. Reliability is obtained based on equation (1) with respect to the statistic of deviation of each surface described above.

Finally, a method for calculating the position and orientation performed in step S203 is described below. The calculation method is substantially similar to that described in the first exemplary embodiment, so that only different portions are supplementarily described below.

In step S701, three-dimensional point cloud data is extracted from the range image captured by the distance imaging apparatus.

Figure 12:
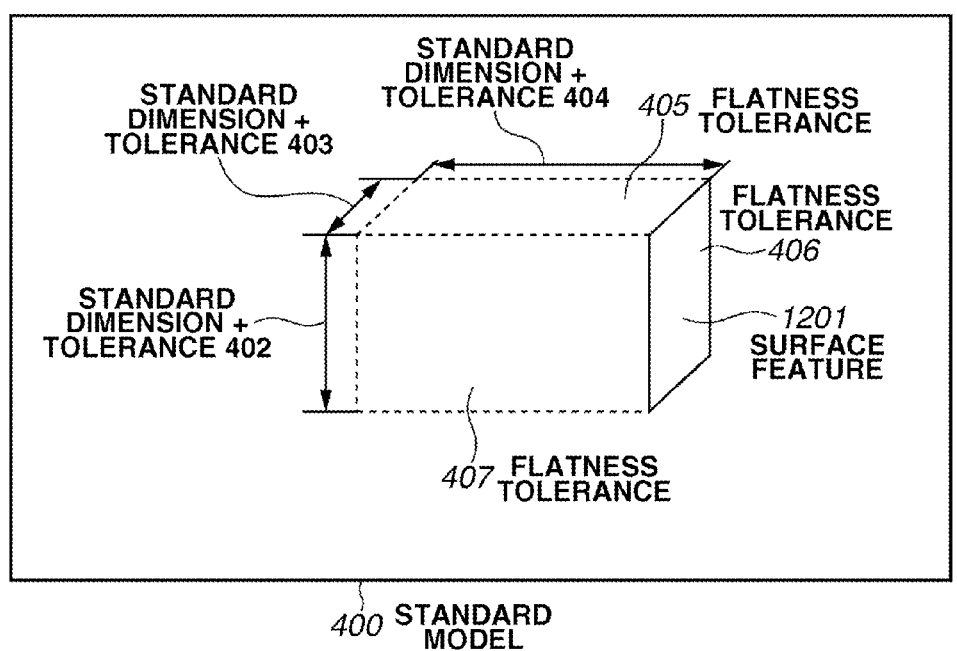
FIG. 12 is a schematic diagram (2) illustrating an example of association.

The association performed in step S703 is described below. As illustrated in FIG. 12, a surface corresponding to the normal direction from each point of a measurement point cloud is searched. A surface intersecting a search line is taken as a corresponding surface on the assumption that the standard model is converted into the coordinate system of the distance imaging apparatus based on the approximate position and orientation.

A method for calculating a coefficient matrix and an error vector performed in step S704 is described below. An equation of a surface extracted from the standard model in the object coordinate system is taken as ax+by+cz=k. If the position and orientation correction value of an object is taken as Δs and each point of the point cloud data is placed on the surface of the corresponding standard model by the correction, the following equation (24) is obtained.

[Math. 29]

$$a \sum_{n=1}^{6} \frac{\partial x}{\partial s_n} \Delta s_n + b \sum_{n=1}^{6} \frac{\partial y}{\partial s_n} \Delta s_n + c \sum_{n=1}^{6} \frac{\partial z}{\partial s_n} \Delta s_n = k - l \quad (24)$$

where, l=ax0+by0+cz0 (constant).

Both sides of equation (24) are multiplied by the reliability hi of a surface including a control point, and all division points are subjected to a series of processes, thereby providing the following simultaneous equation (25):

[Math. 30]

$$\begin{bmatrix} h_1\left(a_1 \frac{\partial x}{\partial s_1} + b_1 \frac{\partial y}{\partial s_1} + c_1 \frac{\partial z}{\partial s_1}\right) & \cdots & h_1\left(a_1 \frac{\partial x}{\partial s_6} + b_1 \frac{\partial y}{\partial s_6} + c_1 \frac{\partial z}{\partial s_6}\right) \\ h_2\left(a_1 \frac{\partial x}{\partial s_1} + b_1 \frac{\partial y}{\partial s_1} + c_1 \frac{\partial z}{\partial s_1}\right) & \cdots & h_2\left(a_1 \frac{\partial x}{\partial s_1} + b_1 \frac{\partial y}{\partial s_1} + c_1 \frac{\partial z}{\partial s_1}\right) \\ \vdots & \ddots & \vdots \end{bmatrix} = \begin{bmatrix} h_1(k_1 - l_1) \\ h_2(k_2 - l_2) \\ \vdots \end{bmatrix} \quad (25)$$

In step S705, equation (25) is solved to calculate the correction value Δsi of the position and orientation, and the correction value Δsi is used to correct the approximate position and orientation.

In an example of the modification, the method is described in which the standard model of an object is described as a set of surfaces, but the standard model may be described as other features. For example, the standard model may be described as point cloud data.

In the exemplary embodiments and the example of the modification described above, the approximate position and orientation of an object is supposed to be provided and repetitively repeated to calculate the final position and orientation. The method for calculating the position and orientation, however, is not limited to the above one, but the position and orientation may be directly calculated if the approximate position and orientation is unknown. For example, if measurement data is feature points on the two-dimensional image, it is general that the position and orientation is directly calculated by a direct linear transform (DLT) (refer to Non Patent Literature 4). The DLT method is the one for calculating three variables representing the position of an object and nine variables being each element of a rotating matrix representing orientation by solving a linear simultaneous equation and has 12 unknown variables. Two equations hold with respect to each point, so that at least six pieces of measurement data are required. As described in the first exemplary embodiment, each equation is multiplied by a weight based on the deviation from the standard model in solving the simultaneous equation to allow preferentially using information about a portion high in machining accuracy.

The method for directly calculating the position and orientation is not limited to the above method, but the 12 variables described above may be calculated based on the correspondence of the three-dimensional point. The feature may be calculated based on the correspondence of a line segment as well as a point (refer to Non Patent Literature 5).

In the exemplary embodiments and the example of the modification described above, the amount of deviation from the standard model is taken as a distance between points where a line segment is divided at equally spaced intervals or a distance between centers of gravity of a surface, but the amount of deviation may be taken as others instead of the above distances. If a line segment is used as a feature, a distance between the line segments may be taken as the amount of deviation. The distance between the line segments is taken as the distance which is the shortest in distance between the end points of a line segment and the distance between the end point of one line segment and the intersection of a normal line extended from the end point and another line segment. If a surface is treated as a feature, flatness may be taken as the amount of deviation. The flatness is taken as a difference between the maximum value (peak) and the minimum value (bottom) of distortion of a surface. The flow for calculating the amount of deviation is similar to that described in FIG. 3 or FIG. 9 and can be realized by replacing the feature and the amount of deviation with a line segment and a distance between line segments or a surface and flatness.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-040595 filed Feb. 25, 2010, which is hereby incorporated by reference herein in its entirety.

The invention claimed is:

1. A position and orientation estimation method comprising:
   obtaining a statistic of deviation of a geometric feature constituting a three-dimensional geometric model of an object for each geometric feature based on tolerance data for the object, the tolerance data representing allowable differences between the object and the three-dimensional geometric model of the object;
   setting a reliability for each geometric feature based on the statistic of deviation, wherein the reliability is set higher as the statistic of deviation is smaller;
   obtaining an approximate position and orientation of the object;
   extracting an image feature of a captured image, wherein the image feature is an edge;
   associating the geometric feature with the image feature based on the obtained approximate position and orientation for each geometric feature;
   calculating an amount of difference between the geometric feature and the image feature for each geometric feature; and
   estimating the position and orientation of the object by correcting the obtained approximate position and orientation based on the reliability and the amount of difference of each geometric feature.

2. The position and orientation estimation method according to claim 1, wherein obtaining a statistic of deviation comprises:
   extracting a line segment constituting the three-dimensional geometric model;
   extracting a tolerance causing a deviation of the line segment;
   calculating the tolerance for each predetermined interval of the line segment; and
   generating a vector of a tolerance in the maximum tolerance and taking the vector as the statistic of deviation.

3. The position and orientation estimation method according to claim 1, wherein the statistic of deviation is represented by probability distribution.

4. The position and orientation estimation method according to claim 3, wherein obtaining a statistic of deviation comprises:
   extracting a line segment constituting the three-dimensional geometric model;
   extracting a tolerance causing a deviation of the line segment;
   calculating the tolerance for each predetermined interval of the line segment; and
   generating a vector of a normal distribution based on the tolerance and taking the vector as the statistic of deviation.

5. The position and orientation estimation method according to claim 1, wherein obtaining a statistic of deviation comprises:
   extracting a surface constituting the three-dimensional geometric model;
   calculating a tolerance in the center of gravity of the surface; and
   generating a vector of a tolerance in the maximum tolerance and taking the vector as the statistic of deviation.

6. The position and orientation estimation method according to claim 1, further comprising measuring a geometric feature constituting a shape of the object,
   wherein calculating a statistic of deviation includes measuring the statistic based on a deviation between the measured result and the three-dimensional geometric model.

7. The position and orientation estimation method according to claim 6, wherein measuring a geometric feature includes performing measurement a plurality of times for each plurality of objects.

8. The position and orientation estimation method according to claim 6, wherein measuring a geometric feature includes performing measurement a plurality of times for each plurality of measurement positions.

9. The position and orientation estimation method according to claim 1, wherein the geometric feature is a point, line segment, or surface.

10. The position and orientation estimation method according to claim 1, wherein calculating the reliability is calculated using a likelihood function.

11. A non-transitory storage medium storing a program for causing a computer to execute the position and orientation estimation method according to claim 1.

12. A position and orientation estimation apparatus comprising:
   a statistic obtaining unit configured to obtain a statistic of deviation of a geometric feature constituting a three-dimensional geometric model of the object for each geometric feature based on tolerance data for the object, the tolerance data representing allowable differences between the object and the three-dimensional geometric model of the object;
   a reliability calculation unit configured to calculate a reliability for each geometric feature based on the statistic of deviation, wherein the reliability is set higher as the statistic of deviation is smaller;
   an obtaining unit configured to obtain an approximate position and orientation of the object;
   an image feature extraction unit configured to extract an image feature of a captured image captured by image capture means, wherein the image feature is an edge;
   an association unit configured to associate the geometric feature with the image feature based on the obtained approximate position and orientation for each geometric feature;
   a deviation-amount calculation unit configured to calculate an amount of difference between the geometric feature and the image feature for each geometric feature; and
   position and orientation estimation unit configured to estimate a position and orientation of the object by correcting the obtained approximate position and orientation based on the reliability and the amount of difference of each geometric feature.

13. The position and orientation estimation apparatus according to claim 12, further comprising an image capture unit configured to capture an image of the object.

14. The position and orientation estimation apparatus according to claim 13, wherein the image capture unit captures a range image in a real space as the captured image.

* * * * *